United States Patent
Szymbor et al.

(10) Patent No.: US 7,931,276 B2
(45) Date of Patent: Apr. 26, 2011

(54) BRUSH SEAL

(75) Inventors: John A. Szymbor, Sanford, ME (US);
Mark E. Addis, Kennebunk, ME (US)

(73) Assignee: United Technologies Corporation,
Hartford, CT (US)

( * ) Notice: Subject to any disclaimer, the term of this patent is extended or adjusted under 35 U.S.C. 154(b) by 1333 days.

(21) Appl. No.: 10/104,337

(22) Filed: Mar. 20, 2002

(65) Prior Publication Data

US 2003/0178778 A1    Sep. 25, 2003

(51) Int. Cl.
*F16J 15/447*    (2006.01)

(52) U.S. Cl. .......................................... 277/355

(58) Field of Classification Search .................. 277/355, 277/387–388, 401, 926
See application file for complete search history.

(56) References Cited

U.S. PATENT DOCUMENTS

| | | | | |
|---|---|---|---|---|
| 885,032 | A * | 4/1908 | Ferranti | 277/355 |
| 3,917,150 | A * | 11/1975 | Ferguson et al. | 277/355 |
| 4,957,301 | A * | 9/1990 | Clay et al. | 277/345 |
| 5,135,237 | A * | 8/1992 | Flower | 277/355 |
| 5,165,758 | A * | 11/1992 | Howe | 300/21 |
| 5,183,197 | A * | 2/1993 | Howe | 277/355 |
| 5,316,318 | A * | 5/1994 | Veau | 277/355 |
| 5,425,543 | A * | 6/1995 | Buckshaw et al. | 277/350 |
| 5,474,305 | A * | 12/1995 | Flower | 277/355 |
| 5,678,898 | A * | 10/1997 | Bagepalli et al. | 300/21 |
| 5,704,760 | A * | 1/1998 | Bouchard et al. | 277/355 |
| 5,752,805 | A * | 5/1998 | Gail et al. | 415/229 |
| 5,799,952 | A * | 9/1998 | Morrison et al. | 277/355 |
| 6,027,121 | A * | 2/2000 | Cromer et al. | 277/355 |
| 6,196,550 | B1 * | 3/2001 | Arora et al. | 277/355 |
| 6,257,588 | B1 * | 7/2001 | Bagepalli et al. | 277/355 |
| 6,293,553 | B1 * | 9/2001 | Werner et al. | 277/355 |
| 6,302,400 | B1 * | 10/2001 | Werner et al. | 277/355 |
| 6,331,006 | B1 * | 12/2001 | Baily et al. | 277/355 |
| 6,378,873 | B1 * | 4/2002 | Mayer et al. | 277/355 |
| 6,536,773 | B2 * | 3/2003 | Datta | 277/355 |
| 6,880,829 | B1 * | 4/2005 | Datta | 277/350 |
| 6,913,265 | B2 * | 7/2005 | Datta | 277/355 |
| 6,996,885 | B2 * | 2/2006 | Szymbor et al. | 277/355 |
| 7,340,816 | B2 * | 3/2008 | Szymbor et al. | 29/467 |
| 7,454,822 | B2 * | 11/2008 | Szymbor et al. | 277/355 |

FOREIGN PATENT DOCUMENTS

EP    469 826 A2    5/1992
WO    9906673    11/1999

* cited by examiner

*Primary Examiner* — Peter M Cuomo
*Assistant Examiner* — Christopher Boswell
(74) *Attorney, Agent, or Firm* — Bachman & LaPointe, P.C.

(57) ABSTRACT

A brush seal, comprising: a bristle arrangement with a plurality of bristles; and a joint securing the bristles together; plates flanking the bristle arrangement; and a feature on the plates to receive the joint. A brush seal, comprising: a plurality of bristles, each having a first end and an opposed second end; and plates receiving the bristles therebetween, each having a first end and a second end. The first ends of the bristles extend past the first end of the plates and the second ends of the bristles reside between the first and second ends of the plates. A method of repairing a brush seal, comprising the steps of: providing a brush seal having a bristle arrangement secured between plates; removing the bristle arrangement from the plates; providing a replacement bristle arrangement; and placing said replacement bristle arrangement between the plates.

28 Claims, 4 Drawing Sheets

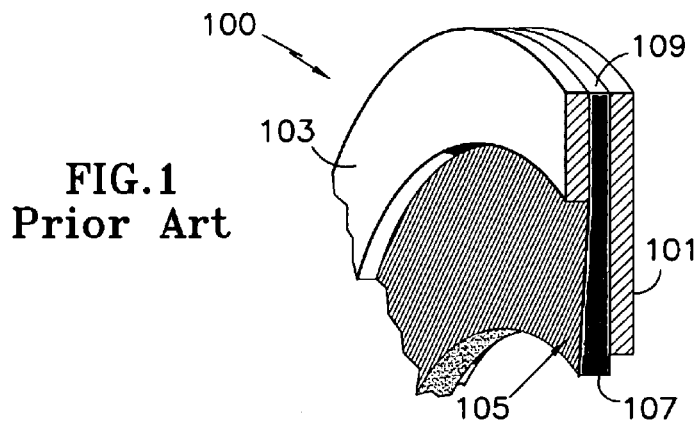
FIG.1 Prior Art
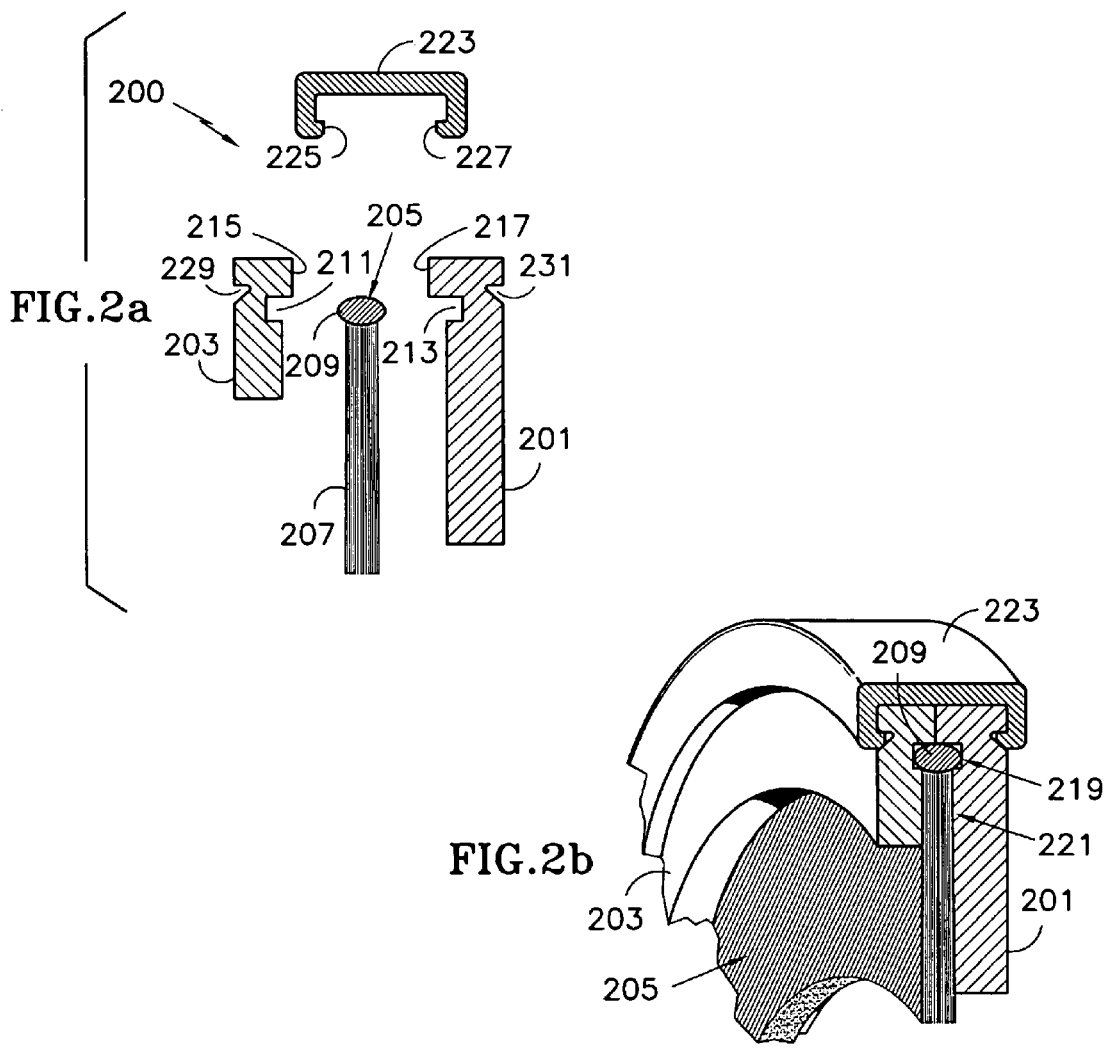
FIG.2a
FIG.2b

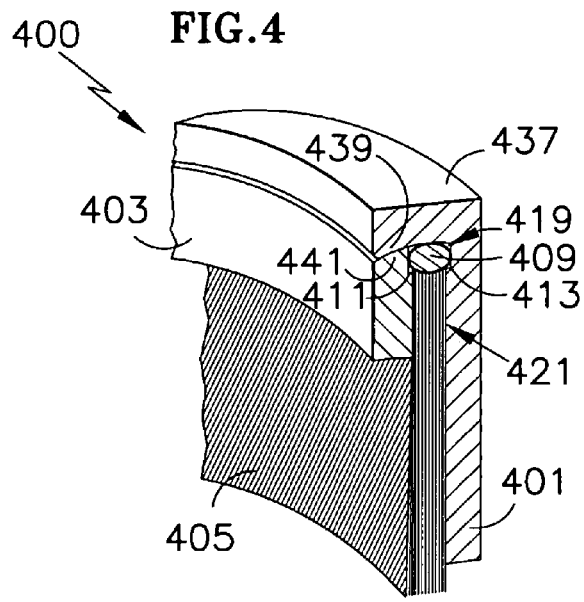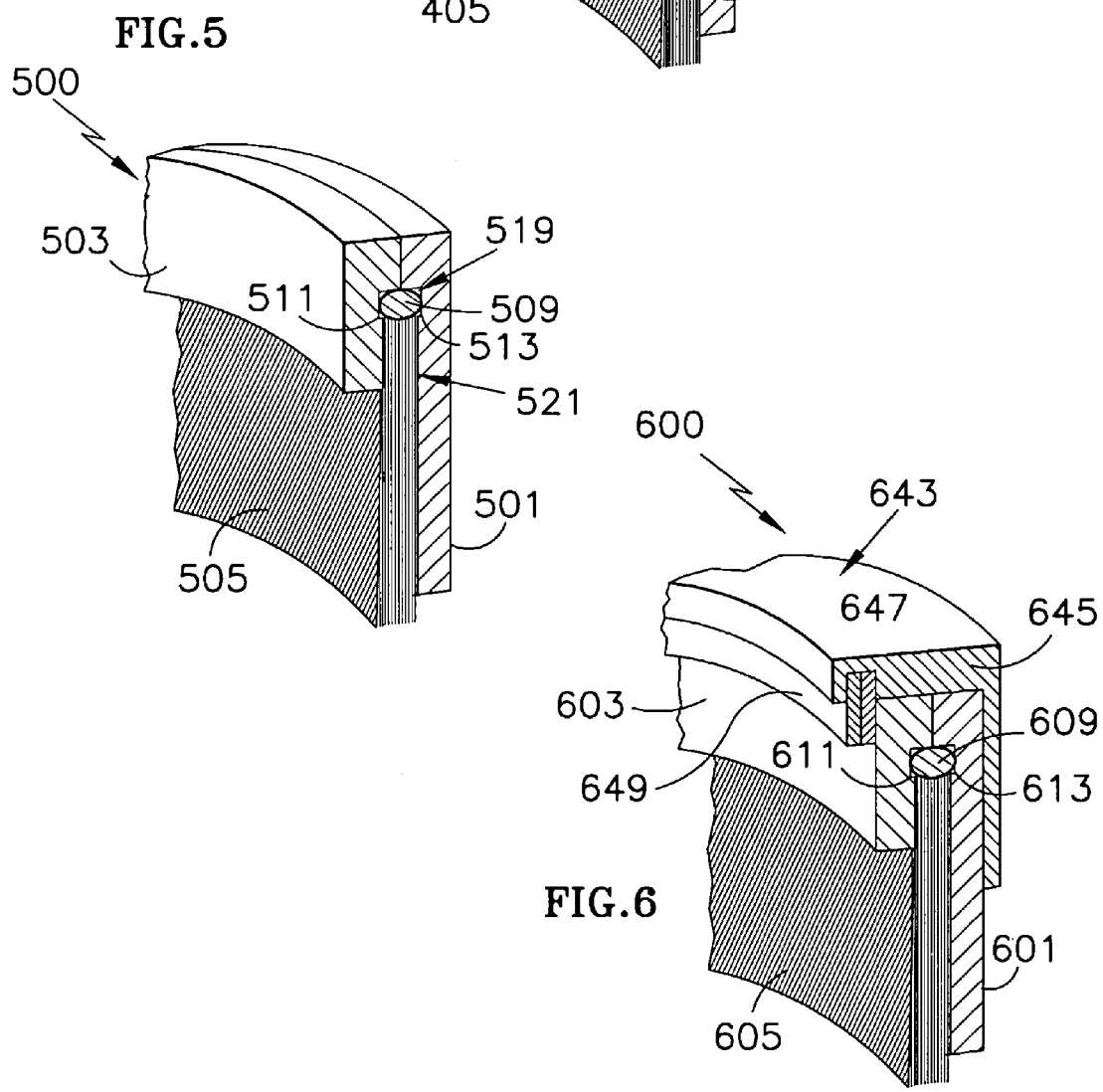

BRUSH SEAL

CROSS REFERENCE TO RELATED APPLICATIONS

This application is related to pending United States patent application Ser. No. 10/074,191 filed on Feb. 12, 2002, herein incorporated by reference.

BACKGROUND OF INVENTION

This invention relates to brush seals. Specifically, this invention relates to the various components that form the brush seal.

Brush seals are commonly used on gas turbine engines. The brush seals typically prevent secondary flow in the engine from escaping through a gap between a stationary part (e.g. a diffuser case) and a rotating part (e.g. a turbine shaft). Brush seals can have other uses, such as sealing a gap between stationary parts of the engine.

A brush seal typically includes packs of wire bristles sandwiched between plates. The bristle packs and plates are typically welded together to form the brush seal. The brush seal must undergo heat treatment after the welding step to relieve any residual stresses. Heat treatment typically involves securing the brush seal within a fixture, then placing the fixture in an oven. The heat treatment process is time consuming and can be expensive.

The welding step transforms the discrete sub-assemblies of the brush seal into one piece. The one-piece arrangement prevents the removal of a sub-assembly without affecting or damaging the remainder of the brush seal. This means a mechanic must replace the entire brush seal during maintenance. Replacement of the entire brush seal must occur despite the fact that only one of the sub-assemblies (typically the bristle packs) needs replacement.

The bristle packs of the brush seal are expensive. The main factor influencing cost is the amount of raw material used. Each individual bristle in the bristle pack is a taken from a length of wire. A commonly used wire is a 0.002", 0.003", 0.004 or 0.006" diameter cobalt alloy wire. One type of bristle pack can have approximately 5000 bristles per linear inch. This type of bristle pack clearly contains a large amount of wire. When used in a 12" outer diameter single stage brush seal, this type of bristle pack can contain approximately 2.6 miles of wire.

SUMMARY OF INVENTION

It is an object of the present invention to provide a new and improved brush seal.

It is a further object of the present invention to produce a brush seal at a reduced cost.

It is a further object of the present invention to produce a brush seal that uses less raw material.

It is a further object of the present invention to provide a brush seal that may not require heat treatment.

It is a further object of the present invention to provide a brush seal with an extended life.

It is a further object of the present invention to provide a brush seal with replaceable sub-assemblies.

These and other objects of the present invention are achieved in one aspect by a brush seal. The brush seal comprises: a bristle arrangement, including a plurality of bristles and a joint securing the bristles together; plates flanking the bristle arrangement; and a feature on the plates to receive the joint.

These and other objects of the present invention are achieved in another aspect by brush seal. The brush seals comprises: a plurality of bristles, each having a first end and an opposed second end; and plates receiving the bristles therebetween, each having a first end and a second end. The first ends of the bristles extend past said first ends of said plates and the second ends of the bristles reside between the first and second ends of the plates.

These and other objects of the present invention are achieved in another aspect by method of repairing a brush seal. The method comprises the steps of: providing a brush seal having a bristle arrangement secured between plates; removing the bristle arrangement from the plates; providing a replacement bristle arrangement; and placing said replacement bristle arrangement between the plates.

BRIEF DESCRIPTION OF DRAWINGS

Other uses and advantages of the present invention will become apparent to those skilled in the art upon reference to the specification and the drawings, in which:

FIG. 1 is a perspective view of a section of a conventional brush seal;

FIG. 2a is a cross-sectional view a brush seal of the present invention;

FIG. 2b is a perspective view of a section of the brush seal in FIG. 2a;

FIG. 3b is a perspective view of an alternate arrangement of the brush seal in FIG. 3a;

FIG. 4 is a perspective view of a section of another brush seal of the present invention;

FIG. 5 is a perspective view of a section of another brush seal of the present invention;

FIG. 6 is a perspective view of a section of another brush seal of the present invention.

DETAILED DESCRIPTION

Figure 3A:
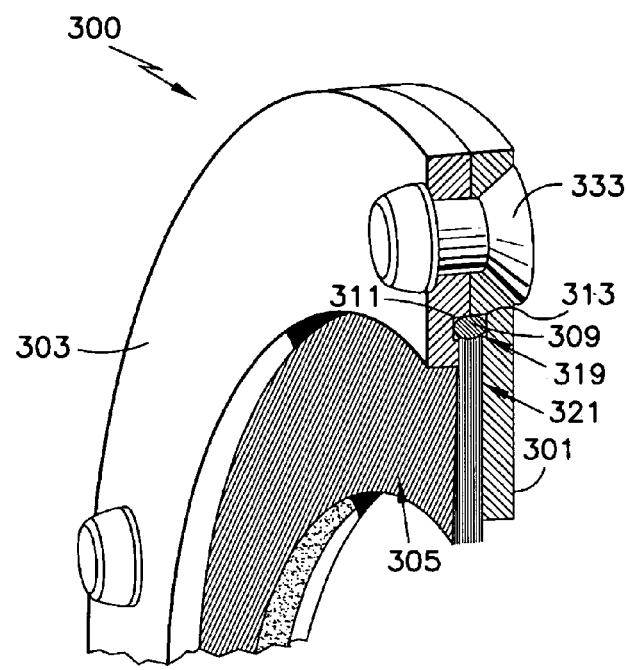
FIG. 3a is a perspective view of a section of another brush seal of the present invention.

FIG. 1 displays a conventional annular brush seal 100. Although shown as a single stage, the brush seal 100 could have multiple stages. The brush seal 100 includes several sub-assemblies, namely a back plate 101, side plate 103 and a bristle pack 105. The metal plates 101, 103 flank the bristle pack 105.

The bristle pack 105 comprises a plurality of densely arranged wire bristles. Each of the bristles has a first end 107 and an opposed second end 109. While extending at an angle to a radial line, the first ends 107 of the bristles reside at the inner diameter of the brush seal 100. The second ends 109 of the bristles reside at the outer diameter of the brush seal 100.

The plates 101,103 and the bristle pack 105 are welded together to form the brush seal 100. Specifically, the outer diameter of the plates 101, 103 and the bristle pack 105 are welded together to sandwich the bristles between the plates 101, 103.

FIGS. 2a and 2b display one alternative embodiment of a brush seal 200 of the present invention. Similar to the conventional brush seal 100, the brush seal 200 includes a back plate 201 and a side plate 203.

Differently than the conventional brush seal 100, the brush seal 200 uses a pre-assembled bristle assembly. In addition, the brush seal 200 has plates 201, 203 removably secured to each other. Each of these features will now be described in further detail.

The brush seal 200 includes a bristle arrangement 205. The bristle arrangement 205 includes a plurality of bristles 207 secured together by a joint 209. The bristles 207 could be made from the same cobalt alloy wire as the bristles in the conventional brush seal 100.

Since the bristle arrangement 205 described herein is annular, one could refer to the bristle arrangement 205 as a bristle ring. The bristle arrangement 205 could, however, have other shapes. For example, the bristle arrangement 205 could have an arcuate (not shown) or a linear shape (not shown).

The joint 209 extends continuously along the outer diameter of the bristle arrangement 205. Preferably, the joint 209 is a weld joint. U.S. patent application Ser. No. 10/074,191 describes in more detail the method of making the bristle arrangement 205.

The present invention could use other methods to produce the joint 209.

The joint 209 retains the bristles 207 in the bristle arrangement 205.

Differently than the conventional brush seal 100, the joint 209 obviates the need to weld the bristles 207 to the plates 201, 203.

The brush seal 200 retains the bristle arrangement 205 using grooves 211, 213 in the inner faces 215, 217 of the plates 201, 203. When the inner faces 215, 217 of the plates 201, 203 abut (FIG. 2b), the grooves 211, 213 define a cavity 219 which receives the joint 209 of the bristle arrangement 205. Although the joint 209 preferably does not interference fit within the cavity 219, the cavity 219 should prevent radial movement of the bristle arrangement 205 during engine operation.

The inner faces 215, 217 also form a gap 221 in communication with the cavity 219. The gap 221 is sufficiently large to allow the bristles 207 to extend past the plates 201, 203. Preferably, however, the gap 221 is sufficiently small to compress the bristles 207 and to prevent movement of the bristle arrangement 205 during engine operation.

As an alternative, the inner faces 215, 217 of the plates 201, 203 at the gap 221 could have features thereon to improve retention of the bristle arrangement 205. Knurls (not shown) are an example of such features.

The use of the bristle arrangement 205 highlights one benefit of the present invention. The brush seal 200 can use shorter bristles 207 than the conventional brush seal 100. The conventional brush seal 100 must weld the bristles 107 to the plates 101,103. Since the weld is located at the outer diameter of the brush seal 100, the bristles 100 must extend to the outer diameter.

The brush seal 200 does not weld of the bristles 207 to the plates 201, 203. Therefore, the bristles 207 need not extend to the outer diameter of the brush seal 200. As seen in FIG. 2b, the outermost extent of the bristle arrangement 205 is at a position medial to the inner diameter and the outer diameter of the brush seal 200.

The present invention can reduce the length of the bristles 207 up to approximately 20%. Using the example above, reducing the length of the bristles in a 12" outer diameter single stage brush seal by 20% can save approximately 0.5 miles of wire.

Rather than welding, the brush seal 200 uses a retainer to secure the plates 201, 203 together. Specifically, the brush seal 200 uses a clip 223 to secure the plates 201, 203 together.

The clip 223 can have a C-shape with extensions 225, 227 that engage corresponding grooves 229, 231 in the plates 201, 203.

To assemble the brush seal, an operator could place the back plate 201 in a fixture (not shown). The operator would then place the joint 209 of the bristle arrangement 205 in the groove 213. The operator would then place the side plate 203 over the bristle arrangement 205 (ensuring the joint 209 enters the groove 211). The operator would then tighten the fixture to sandwich bristle arrangement 205 between the plates 201, 203.

Finally, the operator secures the retaining clip 223 to the plates 201, 203 with conventional techniques. For example, the operator could set one extension 225 in the corresponding groove 229. The operator would then deflect the other extension 227 over the back plate 201. The operator continues to move the extension 227 towards the groove 231. Upon reaching the groove 231, the extension 227 resiles into the groove 231.

The clip 223 should have sufficient strength to keep the bristle arrangement 205 between the plates 201, 203. The clip 223 could be made from any suitable material. With the clip 223 secured to the plates 201, 203, the operator can now remove the brush seal 200 from the fixture.

The use of the clip 223 highlights another benefit of the present invention. The assembly process of the brush seal 200 can eliminate the heat treating step. Since the assembly process does not weld the plates 201, 203 together, the process does not build up residual stresses in the materials. As discussed above, conventional processes used the heat treating step to reduce these residual stresses.

The present invention can use other methods to retain the bristle ring between the plates. FIG. 3 shows one such alternative embodiment. Similar to the brush seal 200, the figure shows a brush seal 300 with a back plate 301, side plate 303 and bristle arrangement 305. The plates 301, 303 include grooves 311, 313 that combine to form a cavity 319 for receiving a joint 309 of the bristle arrangement 305. The abutting plates 301, 303 also form a gap 321 for the bristles to extend past the plates 301, 303.

Rather than using the clip 223, the brush seal 300 uses a rivet 333 to secure the plates 301, 303 together. The operator can install the rivet 333 using conventional techniques. Although described as a rivet, the brush seal 300 could use any other suitable fastener such as a drive pin (not shown), or a dowel (not shown) or spring pin (not shown) inserted into the plates at an angle.

Figure 3B:
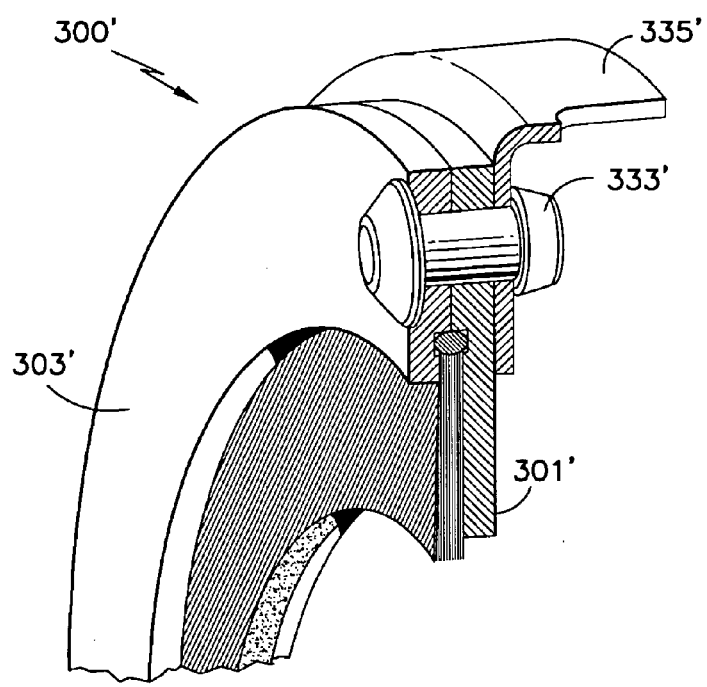

FIG. 3b shows an alternative method of assembling the brush seal 300' with the rivet 333'. Rather than just securing the plates 301', 303', the rivet 333' also retains an annular support flange 335'. The flange 335' provides an alternate method of installing the brush seal 300' in the engine. Even though the flange 335' has been described as a separate subassembly from the back plate 301', the back plate 301' and the flange 335' could also be one-piece.

FIG. 4 displays another alternative embodiment of the present invention. Similar to the other brush seals of the present invention, the figure displays a brush seal 400 with a back plate 401, side plate 403 and bristle arrangement 405. The plates 401, 403 include grooves 411, 413 that combine to form a cavity 419 for receiving a joint 409 of the bristle arrangement 405. The abutting plates 401, 403 also form a gap 421 for the bristles to extend past the plates 401, 403.

Rather than using a separate retainer, the brush seal 400 uses features on the plates 401, 403 to retain the plates 401, 403 together. Specifically, the back plate 401 includes an upper extension 437 with an angled surface 439 facing the side plate 403. Likewise, the side plate 403 has an angled surface 441 facing the back plate 401.

The annular side plate 403 has a larger diameter than the extension 437.

Therefore, the operator must interference fit the side plate 403 into the back plate 401 using conventional techniques. Once assembled together (as seen in FIG. 4), the angled surfaces 439, 441 of the plates 401, 403 abut each other. The orientation of the angled surfaces 439, 441 urges the plates 401, 403 together. This orientation helps the plates 401, 403 retain the bristle arrangement 405 therebetween.

FIG. 5 displays another alternative embodiment of the present invention. Similar to the other brush seals of the present invention, the figure displays a brush seal 500 with a back plate 501, side plate 503 and bristle arrangement 505. The plates 501, 503 include grooves 511, 513 that combine to form a cavity 519 for receiving a joint 509 of the bristle arrangement 505. The abutting plates 501, 503 also form a gap 521 for the bristles to extend past the plates 501, 503.

Differently than the other brush seals of the present invention, the brush seal 500 bonds the plates 501, 503 together to retain the bristle arrangement 505 therebetween. Suitable bonding techniques include, for example, radial or axial welding, brazing and using an adhesive such as epoxy.

FIG. 6 displays another alternative embodiment of the present invention. Similar to the other brush seals of the present invention, the figure displays a brush seal 600 with a back plate 601, side plate 603 and bristle arrangement 605.

Differently than the other brush seals of the present invention, the brush seal 600 includes a snap ring assembly 643 to retain the bristle arrangement 605 between the plates 601, 603. The snap ring assembly 643 includes an annular flange 645. The flange 645 can have an L-shape in cross-section. One section of the flange has a groove 647.

The operator assembles the brush seal 600 as follows. The operator places the flange 645 in a fixture (not shown). Then operator then inserts the back plate 601 against the flange 645. The operator then places the joint 609 of the bristle arrangement 605 in the groove 613 of the back plate 601. The operator then places the side plate 603 over the bristle arrangement 605 (ensuring the joint 609 enters the groove 611).

Finally, the operator finally places one or more snap rings 649 in the groove 647 using conventional techniques. The snap rings 649 keep the side plate 603 against the back plate 601 to sandwich bristle arrangement 605 therebetween.

Although described as a snap ring, the brush seal 600 could use any other suitable retainer. Examples of suitable retainers include wave washers (not shown), retaining rings (not shown) and radially oriented dowels (not shown) or spring pins (not shown) driven through the flange 645.

Even though the flange 645 has been described as a separate subassembly from the back plate 601, the back plate 601 and the flange 645 could also be one-piece.

Figure 7:
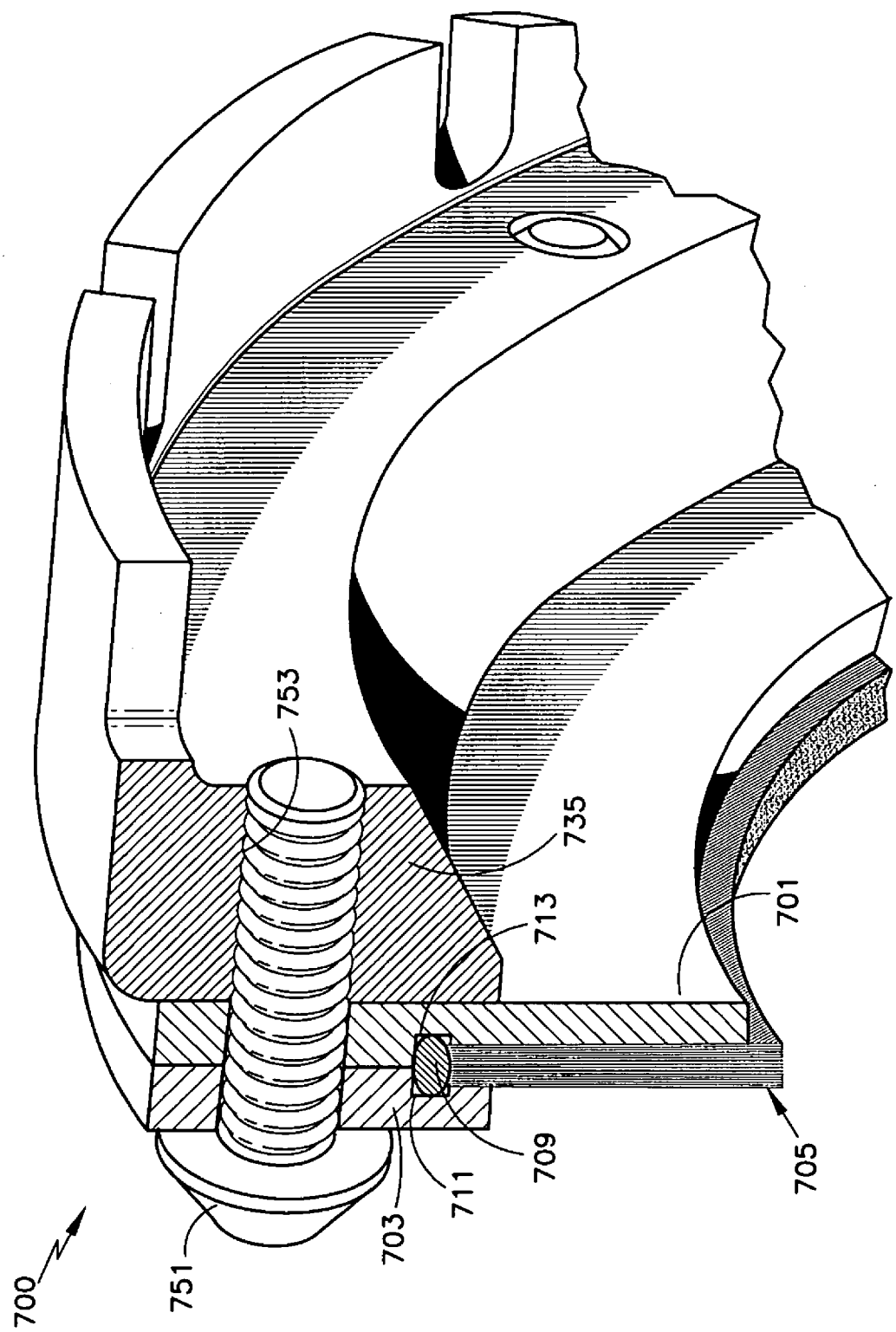
FIG. 7 is a perspective view of a section of another brush seal of the present invention.

FIG. 7 displays another alternative embodiment of the present invention. Similar to the other brush seals of the present invention, the figure displays a brush seal 700 with a back plate 701, side plate 703 and bristle arrangement 705.

The brush seal 700 also includes an annular support flange 735 for installing the brush seal 700 in the engine. The flange 735 mounts to the engine using suitable fasteners (not shown). In this embodiment, threaded fasteners 751 secure the plates 701, 703 to the flange 735.

The operator assembles the brush seal 700 as follows. The operator places the flange 735 in a fixture (not shown). Then operator then places the back plate 701 against the flange 735. The operator then places the joint 709 of the bristle arrangement 705 in the groove 713 of the back plate 701. The operator then places the side plate 703 over the bristle arrangement 705 (ensuring the joint 709 enters the groove 711).

Finally, the operator inserts the fasteners 751 through the aligned openings in the plates 701, 703 and into a threaded hole 753 in the flange 735. The operator applies a sufficient torque to the fasteners 751 to keep the side plate 703 against the back plate 701 for sandwiching the bristle arrangement 705 therebetween. Although shown as a screw, the brush seal 700 could utilize any other suitable type of fastener.

Even though the flange 735 has been described as a separate subassembly from the back plate 701, the back plate 701 and the flange 735 could also be one-piece. A similar stand-alone design (not shown), incorporating only the plates 701, 703 and not the flange 735, could also be produced. This design would require the back plate 701 to have sufficient thickness for placing a threaded hole therein to receive the fastener.

The brush seal 700 highlights another benefit of the present invention. The present invention allows a mechanic to replace the bristle arrangement 705 without replacing the other subassemblies of the brush seal 700. Such replacement can occur after use of the brush seal 700 in the engine, or even before actual use.

The mechanic replaces the bristle arrangement 705 as follows. The mechanic removes the fasteners 751 to detach the plates 701, 703 from the flange 735. The flange 735 preferably remains in the engine, while the plates 701, 703 and the bristle arrangement 705 are removed. Separated from the flange 735, the plates 701, 703 no longer sandwich the bristle arrangement 705. The mechanic can now remove the bristle arrangement 705 from the grooves 711, 713 of the plates 701, 703. If necessary, the mechanic could have first removed the entire brush seal 700 from the engine by detaching the flange 735 from the engine, then performed the above steps.

As an alternative to removing the fasteners 751 entirely from the flange 735, the mechanic could merely loosen the fasteners 751 (i.e. keeping the fasteners 751 in the threaded hole 753) sufficiently to remove the bristle arrangement 705 from the grooves 711, 713 of the plates 701, 703.

After removing the bristle arrangement 705, the mechanic then obtains a replacement bristle arrangement 705. As a final step, the mechanic reassembles the brush seal 700 using the aforementioned assembly process.

The present invention has been described in connection with the preferred embodiments of the various figures. It is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

The invention claimed is:

1. A brush seal, comprising:
   a pre-assembled bristle arrangement, including:
   a plurality of bristles; and
   a weld joint securing together said plurality of bristles;
   plates flanking said bristle arrangement; and
   a feature in each of said plates to receive said joint.

2. The brush seal as recited in claim 1, wherein said feature comprises a groove in each of said plates.

3. The brush seal as recited in claim 2, wherein said groove is annular.

4. The brush seal as recited in claim 1, wherein said bristle arrangement is annular.

5. The brush seal as recited in claim 1, wherein said plates are bonded together.

6. The brush seal as recited in claim 1, wherein said plates are removably mounted together.

7. The brush seal as recited in claim 6, further comprising fasteners for removably securing together said plates.

8. The brush seal as recited in claim 6, wherein said plates are press fit together.

9. The brush seal as recited in claim 6, further comprising a retainer removably securing together said plates.

10. The brush seal as recited in claim 9, wherein said retainer comprises a snap ring.

11. The brush seal as recited in claim 1, wherein each of said bristles have a first end and an opposed second end, said weld joint located at said second ends of said bristles.

12. The brush seal as claimed in claim 1, wherein each said feature is recessed from ends of said plates.

13. A brush seal, comprising:
   a bristle arrangement, including:
      a plurality of bristles, each of said bristles having a first end and an opposed second end; and
      a weld joint securing together said plurality of bristles; and
   plates receiving said bristles therebetween, each of said plates being in direct contact with said bristles and having a first end and a second end;
   wherein said first ends of said bristles extend past said first ends of said plates and said joint resides away from said second end of said plates; and a feature in each of the plates to receive said joint.

14. The brush seal as recited in claim 13, wherein said second ends of said bristles are recessed from said second ends of said plates.

15. The brush seal as recited in claim 13, wherein said second ends of said bristles are secured together.

16. The brush seal as recited in claim 15, wherein said bristles form an annulus.

17. The brush seal as recited in claim 13, wherein said joint comprises a weld joint.

18. The brush seal as recited in claim 17, wherein said second ends of said bristles are secured together by said weld joint.

19. A method of repairing a brush seal, comprising the steps of:
   providing a brush seal having a bristle arrangement secured between plates;
   removing said bristle arrangement from said plates;
   providing a replacement bristle arrangement having a plurality of bristles secured together by a weld joint; and
   placing said weld joint of said replacement bristle arrangement in a feature in each of said plates.

20. The method as recited in claim 19, wherein said removing step comprises separating said plates.

21. The method as recited in claim 20, wherein said separating step comprises removing at least one fastener used to secure said plates together.

22. The method as recited in claim 20, wherein said separating step comprises removing at least one retainer used to secure said plates together.

23. The method of claim 19, wherein said replacement bristle arrangement is annular.

24. The method of claim 19, wherein said plates comprise a side plate and a back plate of said brush seal.

25. The method as recited in claim 19, further comprising the step of securing said weld joint between said plates.

26. The method as recited in claim 25, wherein said securing step comprises bonding or removably securing said plates.

27. A brush seal, comprising:
   a pre-assembled bristle arrangement, including a plurality of bristles and a weld joint securing together said plurality of bristles;
   plates flanking said bristle arrangement; and
   a feature in each of said plates for receiving said weld joint.

28. The brush seal according to claim 27, wherein each said feature comprises a groove.

* * * * *